United States Patent [19]

Rugg et al.

[11] Patent Number: 4,591,386

[45] Date of Patent: * May 27, 1986

[54] CONTINUOUS APPARATUS FOR CHEMICAL CONVERSION OF MATERIALS

[75] Inventors: Barry Rugg, New York; Robert Stanton, New Hyde Park, both of N.Y.

[73] Assignee: New York University, New York, N.Y.

[*] Notice: The portion of the term of this patent subsequent to Feb. 23, 1999 has been disclaimed.

[21] Appl. No.: 479,055

[22] Filed: Mar. 25, 1983

Related U.S. Application Data

[60] Division of Ser. No. 255,189, Apr. 17, 1981, Pat. No. 4,390,375, which is a continuation-in-part of Ser. No. 131,339, Mar. 18, 1980, Pat. No. 4,316,748.

[51] Int. Cl.$^4$ ............................................... B01J 3/04
[52] U.S. Cl. .......................................... 127/1; 127/37; 162/243
[58] Field of Search ...................... 127/1, 37; 425/204, 425/205; 162/18, 56, 243, 246; 366/83, 85, 88, 90

[56] References Cited

U.S. PATENT DOCUMENTS

| | | | |
|---|---|---|---|
| 3,045,283 | 7/1962 | Keiser | 366/77 X |
| 3,666,141 | 5/1972 | Ma et al. | 222/1 |
| 4,088,528 | 5/1978 | Berger et al. | 162/236 |
| 4,316,747 | 2/1982 | Rugg et al. | 127/1 |
| 4,316,748 | 2/1982 | Rugg et al. | 127/1 |
| 4,363,671 | 12/1982 | Rugg et al. | 127/1 |
| 4,390,375 | 6/1983 | Rugg et al. | 127/37 |
| 4,478,644 | 10/1984 | Berger et al. | 127/1 |

OTHER PUBLICATIONS

Chemical Engineers' Handbook, Perry; 4th Ed. § 5-9.

*Primary Examiner*—Richard V. Fisher
*Assistant Examiner*—W. Gary Jones
*Attorney, Agent, or Firm*—Felfe & Lynch

[57] ABSTRACT

A process and apparatus for the acid hydrolysis of waste cellulose to glucose of the type wherein waste cellulose is continuously fed into an inlet port of a twin screw extruder, water is continuously fed into reaction zone in the extruder, downstream of the inlet port, the cellulose is continuously reacted with water in the presence of an acid catalyst at elevated temperature and pressure in the reaction zone while being continuously conveyed to an outlet port of the extruder having a given diameter and the reacted cellulose is discharged from the extruder while the elevated temperature and pressure in the reaction zone is maintained. The elevated pressure is maintained by forming a dynamic seal zone at the upstream end of the reaction and continuously discharging the reacted material downstream of the outlet port at a predetermined volume rate of flow to maintain the pressure by passing the discharge through an orifice pipe having a smaller diameter than the given diameter of the outlet port.

11 Claims, 4 Drawing Figures

CONTINUOUS APPARATUS FOR CHEMICAL CONVERSION OF MATERIALS

BACKGROUND OF THE INVENTION

This is a divisional application of Ser. No. 255,189 filed Apr. 17, 1981 (now U.S. Pat. No. 4,390,375 issued June 28, 1983) which is a continuation-in-part of U.S. Ser. No. 131,339 filed Mar. 18, 1980 (now U.S. Pat. No. 4,316,748 issued Feb. 23, 1982).

The present invention relates to a process and an apparatus for the continuous chemical conversion of materials, in particular to a process and an apparatus for the conversion of waste cellulose to glucose by acid hydrolyzation and more particularly to an improvement in the continuous discharge of materials in the process and apparatus.

Acid hydrolysis of cellulose has been extensively studied for the better part of the century, particularly in connection with the manufacturing from ethanol from wood wastes. It has long been known that cellulose can be hydrolyzed in acid solutions and converted to its monomer, glucose, and the reaction has been experimentally investigated since this discovery. The reaction results from the fact that the monomers of cellulose are anhydroglucose units, and that during hydrolyzation, a water molecule is added to the cellulose monomer unit to obtain the heavier molecular weight glucose.

Recently, there has been a growing interest in the utilization of waste cellulose for energy production, because of the possibility of producing ethyl alcohol from glucose, and for the purposes of materials recovery.

While the acid hydrolysis of cellulose is heterogeneous, it can be regarded as a homogeneous reaction, provided that the cellulose reactant is dispersed in the form of fine particles, i.e., 200-mesh or less. The kinetically predicted sugar yields assume that the cellulose reactant has appropriate chemical reactivity for the acid hydrolysis. The technical problems of cellulose hydrolysis are to a great extent due to the fact that this is not the case. The lack of an adequate amount of chemical reactivity in cellulose is called lack of accessibility. This is related to the highly inert character and crystalline organization on a molecular level of the high molecular weight cellulose, and also the presence of lignin. Hydrogen-bonding almost certainly plays a very important role in the structure of cellulose, and may be a key factor in expalining its chemical inertness.

In general, mechanical treatments, such as, for example, intensive ball milling to sizes below 60 mesh, have been found to be technically effective, but at a high cost which renders any process economically prohibitive. Treatment with high-energy ionizing radiation on the order of 100 megarads has been shown to be effective, however the cost of such large doses of ionizing radiation is too high for industrial usage.

While heretofore successful batch-wise production of glucose from cellulose has been carried out by the acid hydrolysis of waste cellulose, this type of process and the apparatus for carrying it out are insufficient for commercial production.

Copending U.S. application Ser. No. 131,339, now U.S. Pat. No. 4,316,748 teaches a process and apparatus for the continuous conversion of fibrous material to a derivative thereof and in particular for the continuous acid hydrolysis of cellulose to glucose, based upon the use of a hydrolysis reactor which is capable of feeding, conveying and discharging hydrolysable cellulosic materials continuously while maintaining appropriate temperatures and/or pressures in the reaction zone thereof.

According to that disclosure the hydrolysis reactor is a Werner and Pfleiderer ZDS-K 53 (53 mm) corotational two screw extruder which was selected because of its capacity for conveying, mixing and extruding the required amounts of cellulosic feedstock. The extruder allows accurate control of temperature, pressure, residence time, etc. The extruder has the working elements of intermeshing twin screws which eliminate material buildup in the processing section and make feasible close control of residence time, etc., with intensive mixing.

For the continuous processing of materials, the reactor was coupled with an appropriate feeding mechanism for cellulose slurries and a discharge system for reacted material while maintaining the pressure and/or temperature in the reaction zone.

In order to maintain the pressure in the reaction zone during the process, pressure is maintained at the inlet to prevent egress of the material through the feeder by a dynamic seal within the inlet zone of the reactor. Simultaneously, continuous discharge of the hydrolyzed material was accomplished while maintaining the pressure by the use of a discharge system comprising a continuously openable valve which opened in response to a preselected pressure in the reaction zone.

SUMMARY OF THE INVENTION

The main object of the present invention to improve the above mentioned process and apparatus by a continuous discharge of the extruder by continuously discharging the reacted material downstream of the outlet port at a predetermined volume rate of flow to maintain the pressure by passing the discharge through an orifice pipe having a smaller diameter than the given diameter of the outlet port and a preselected length to control the flow solely by the flow conditions in accordance with the Hagen-Poiseveille Law.

These and other objects of the present invention will become apparent from the detailed description of the invention when read with the attached drawings wherein:

DETAILED DESCRIPTION OF THE INVENTION

Figure 1:
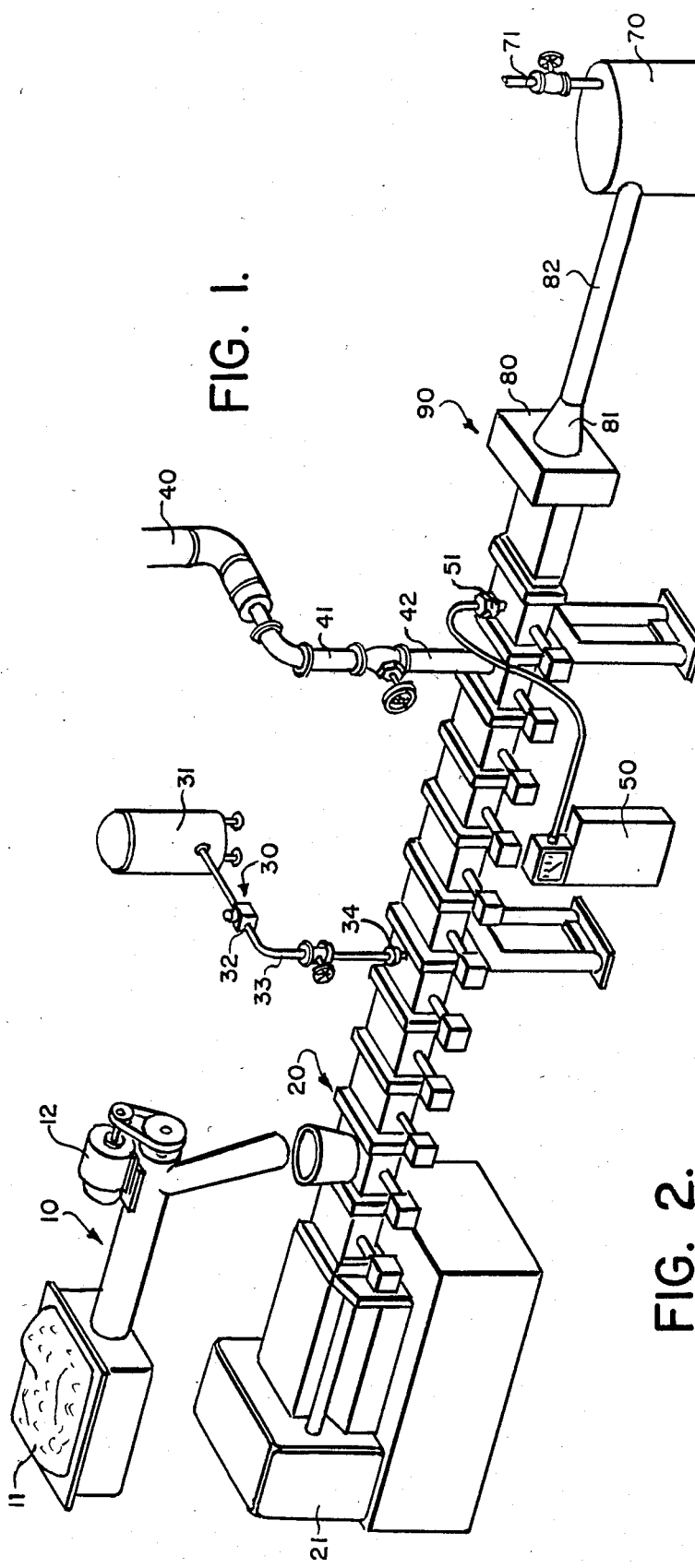
FIG. 1 is a perspective view of the apparatus according to the present invention.
Figure 2:
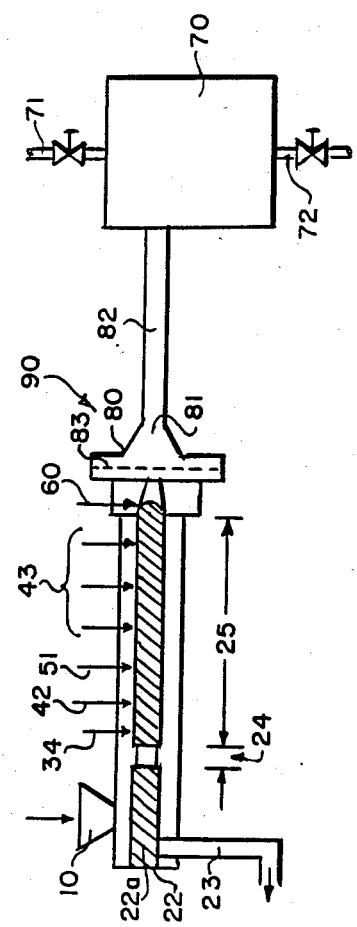
FIG. 2 is a sectional schematic view of the apparatus according to the present invention.

FIG. 1 shows the basic apparatus for carrying out the process according to the present invention. The apparatus includes the Werner and Pfleiderer ZDS-K 53 twin screw extruder 20 having two corotational screws therein driven by a motor 21. The housing 20a includes a feed inlet in which the material to be converted is received. As shown in FIG. 1, in accordance with the present invention dry solid fibrous material in the form of shredded paper, sawdust, etc. is fed into the extruder 20 by means of a screw feeder 10, which as shown in FIG. 2, continuously feeds the material into the extruder to be conveyed thereby.

While in conjunction with the present invention, the input of the dry fibrous material is illustrated, the material, in particular cellulose paper pulp or sawdust can be fed-in in a slurry form in an alternative form of the invention, as is explained in copending U.S. applications Ser. Nos. 131,340 and 131,339.

The extruder 20 includes a reaction zone 25 which is bounded on its inlet side by a dynamic seal zone 24 and discharge means 90 at its outlet side. Upstream of the reaction zone is the inlet portion or preheating zone 22a of twin screws 22 wherein the fibrous input is first received and thereby conveyed into the reaction zone.

In accordance with the process of the present invention, when the fibrous material is received in a slurry, much of the water thereof is removed in the process of the conveyance of the slurry into the reaction zone and for this purpose a dewatering drain 23 is provided upstream of the dynamic seal. Where the fibrous material is fed in dry form, the dewatering drain is not necessary since the liquid added thereto is just sufficient to act as a carrier or, in the case of hydrolysis to act as the reactant and therefore no water is lost as in the case of a slurry input. Water is added, as needed, in the preheating zone and which the acid through input port 34.

The apparatus further includes means 30 for adding an acid catalyst comprising a tank 31 and a metering pump 32 which feeds the acid along pipe 33 into the acid input port 34 for the extruder housing. The acid catalyst input port 34 is shown to be at the beginning of the reaction zone 25 so that the acid acts on the reactants during substantially the entire residence time of the reactants in the reaction zone. However, the input position of the acid catalyst port 34 can be varied, depending upon the temperature in the reaction zone. At high temperatures, the reaction will generally take place faster and thus the acid can be introduced into the reaction zone at a position closer to the outlet thereof.

In the case of the hydrolysis of cellulose to glucose, it is especially advantageous for the reaction to take place at elevated temperatures and in order to bring this about in the most advantageous manner, steam is added to add energy to the reaction zone to obtain a quick increase in temperature. For this, steam supply means 40 are provided including steam pipe 41 and steam input port 42. The steam may also be used as a supply of water for the hydrolysis cellulose upon its condensation in the reaction zone.

Also provided along the extruder housing is a pressure indicator port 51 which in conjunction with pressure indicator means 50 enables a monitoring of the elevated pressure within the reaction zone. Moreover, temperature input ports 43 are also provided to enable monitoring of the temperature within the various zones of the extruder assembly. These zones are set forth in FIG. 3 as zones 1-4 and show a typical thermal configuration of the apparatus during use.

The continuous discharge of the reactants from the extruder is effected by the discharge means 90 which discharges the reactants into the vessel 70. The vessel 70, which may in some embodiments be kept at atmospheric pressure, can, in a particularly advantageous embodiment, be a pressurized vessel such as a pressurized flash tank which is maintained at a somewhat lower pressure than that of the reactor, for example at approximately 100 psi when the operating pressure of the reactor is at 400 psi. This is advantageous since it aids in the separation of by-products of the reaction. For example, a typical by-product of the cellulose to glucose conversion is furfuraldehyde which is a decomposition produce of five carbon sugars such as xylose or xylan. The maintaining of the vessel 70 at high pressure enables the product that is discharged from the reactor to remain in gaseous form and to thus prevent condensation thereof that would occur at the collection vessel 70 in an atmospheric pressure. When the furfuraldehyde is in vapor form, it can be easily separated off via gas vent 71 while the liquid discharge is removed through drain 72.

Furthermore, by maintaining the vessel 70 at an elevated pressure, the steam used in the reactor can also be prevented from condensating and thus can be reused with the concomitant saving in energy for the entire process.

In a further advantageous embodiment, the discharge can be brought to atmospheric pressure by successive pressurized vessels 70 connected in series, each of which is maintained at a gradually lower temperature until atmospheric pressure is reached. In this way, the advantages of the easy separation of the gaseous by-products are obtained, while at the same time the output of the apparatus is at atmospheric pressure.

Figure 3:
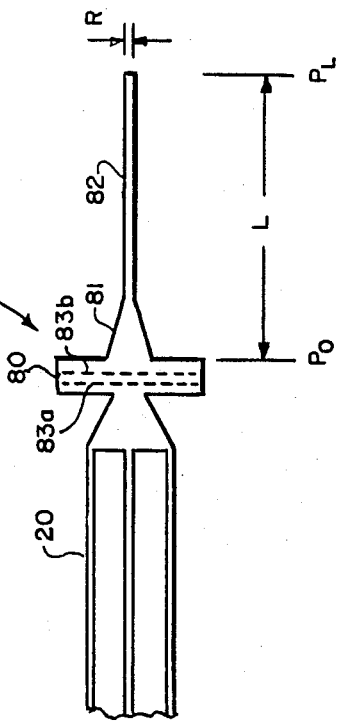
FIG. 3 is a sectional view of the orifice pipe according to the present invention.
Figure 4:
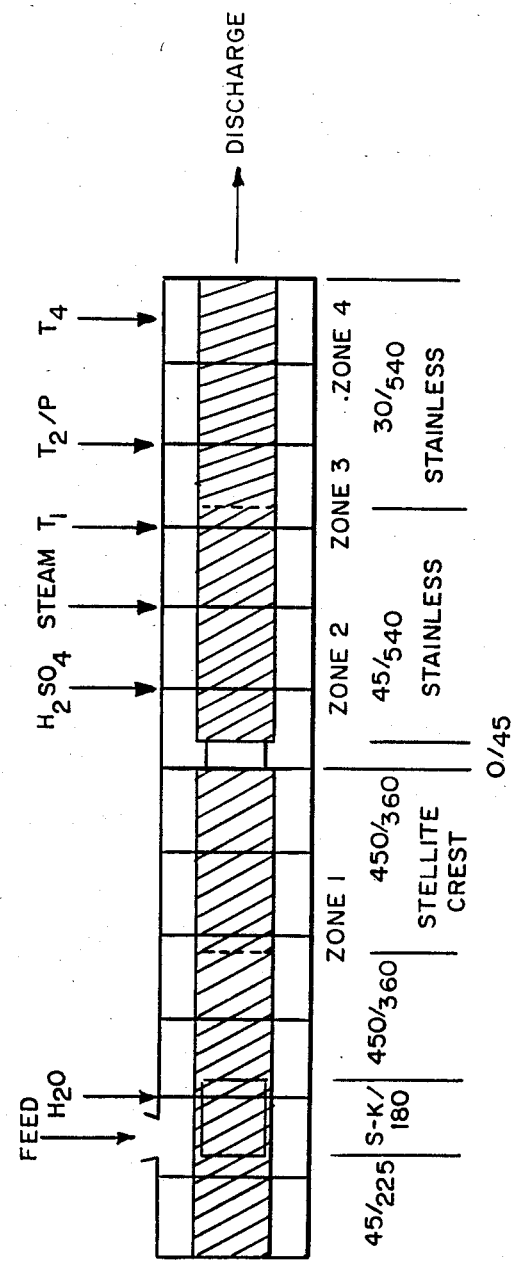
FIG. 4 is a schematic representation of the heat zones in the apparatus of the present invention.

Now turning to FIGS. 2 and 3, the discharge means 80 is discussed in more detail.

While in prior apparatus and methods, either a quasi-continuous operation was achieved by a ball valve or continuous operation was achieved by an operable check valve arrangement the orifice discharge means 90 of the invention comprises pipe 82 of relatively small radius R, with respect to its length L, that is attached to the end of the extruder 20 and includes an initial transition section 81 that gradually reduces the discharge diameter down to that of the remaining orifice pipe 82. The orifice pipe 82 then maintains a constant radius R over its entire length. Preceding the transition section 81 is screening means 80 including a screen 83 or screens 83a, 83b that remove particles that would otherwise clog the orifice pipe 82. The orifice discharge means 90 is an improvement over hydrolysis process and apparatus disclosed in copending application Ser. No. 131,340 since it is a truly continuous system by dint of the elimination of a semi-continuous cycling ball valve discharge system. The main advantages of the completely continuous process are better conversion efficiency by maintaining a more uniform residence time for all material, decreased energy consumption by allowing less steam loss, lower capital and maintenance costs by elimination of expensive and maintenance intensive ball valve and the ability to increase throughput rates by eliminating torque fluctuations caused by cycling ball valve.

The principal behind the orifice discharge means 90 is that it allows material to exit the reactor while maintaining pressure throughout the reaction zone. This is accomplished by making the orifice pipe 82 of such dimensions that for a given pressure differential across the orifice pipe 82 and volume rate of the flow through the reactor, only material and a minimal amount of steam will pass through the orifice pipe. These dimensions are approximately determined by the Hagen-Poiseveille law where:

$$Q = \frac{\pi(P_O - P_L)R^4}{8\mu L}.$$

This gives the relationship between the volume rate of flow and the forces causing the flow, wherein Q is the volume rate of flow, ($P_O-P_L$) is the pressure differential across the orifice pipe, $\mu$ is the viscosity of the material being passed through the pipe, R is the radius of the orifice pipe, and L is the length of the orifice pipe. It must be remembered that the volume rate of flow determines the orifice pipe size and not the other way around. The Hagen-Poiseville law is used in an attempt to match the orifice pipe dimensions with the volume rate of flow. In reality this can only be done by experimentation since both the volume rate of flow and the viscosity vary with the relative proportions of feedstock, water, acid, and steam put into the extruder. It is clear from the Hagen-Poiseveille law that a radius change has a much more profound effect on the potential volume rate of flow than a change in length. Also, it has been found that a pipe length at greater than five times the radius is long enough to prolong cavitation and flashing until after the material has left the orifice pipe. For these reasons the experimentation has utilized orifice pipes at some constant length (>5×radius) while changing radii.

It has been found that orifice pipes ranging from 5-1000 mm in length and 0.1-5 mm in radius can be used to maintain pressure drops from reactor to atmosphere of 100-600 psi. The weight rates of flow in these cases are:

feedstock—50-300 lbs./hr.
H$_2$O—50-500 lbs./hr.
acid—0.5-20 lbs./hr.
steam—40-200 lbs./hr.

The product rate of flow is ≈100-800 lbs./hr. The volume rate of flow of product depends upon its density which varies with reaction conditions. The viscosity of the flow has been determined calculation to be in on the order of 0.10 to 10,000 centipoise.

In the event that the collection vessel 70 is at an elevated pressure, then the pressure differential across the orifice pipe $P_O-P_L$ is merely calculated with $P_L$ corresponding to the pressure maintained in vessel 70. The radius and length of the orifice pipe is suitably selected based upon the selected value for the pressure at the end of the orifice pipe.

In the dynamic seal zone 24, an unthreaded screw section in conjunction with the right hand screw threaded portions upstream thereof and downstream thereof act to produce the dynamic plug which seals the reaction zone and prevents gases from escaping through the input, while enabling the fed in material to be conveyed thereby into the reaction zone.

The dynamic seal, in conjunction with the discharge means 90, maintains the elevated pressure and, where desirable, the elevated temperature in the reaction zone while enabling the screw elements to convey the fed in material into the reaction zone and out of the reaction zone and to enable the reaction process to take place therein.

An example of the process and apparatus of the present invention with respect to the conversion of cellulose to glucose is set forth hereinafter as follows.

EXAMPLE

An example of the process of the invention utilizing the structure of FIGS. 1 and 2 and the reaction zone parameters of FIG. 3 includes:

| Feed Material: | Sawdust |
| --- | --- |
| Screw Feeder Feed Rate: | 130 lb/hr dry |
| Reaction Temperature: | 458° F. (237° C.) |
| Reaction Pressure: | 400 psi |
| Acid: | Sulfuric Acid 3% w/w at 130 lb/hr |
| Water input: | 60 lb/hr (introduced upstream of plug) |
| Machine Screw RPM: | 250 RPM, drive torque 50% |
| Glucose conversion: | 50% based on available cellulose |
| Screen | 25 mesh |
| Reaction zone input: | 130 lb/hr solid; 60 lb/hr water; 130 lb/hr acid solution (@3% w/w); 100 lb steam; effective acid concentration = 3.9 (100)/290 = 1.34% w/w |
| Orifice pipe length | 5" |
| Orifice pipe diameter | 2 mm |

With respect to FIG. 3, the designation 45/225 means 45 mm pitch element, 225 mm long; a 45 mm pitch element will in one complete revolution move material 45 mm forward. The S-K elements in the feed zone are special undercut elements to help feed more efficiently. The 0/45 elements designates the plug zone wherein a spacer 45 mm long replaces the screw elements. The total screw length is 2250 mm.

| PRODUCT OUTPUT: 33% SOLIDS INCLUDING | |
| --- | --- |
| 40 lb/hr | Glucose |
| 15 lb/hr | Unreacted Cellulose |
| 15 lb/hr | Xylose |
| 28 lb/hr | Lignin |
| 13 lb/hr | Hydroxy Methyl Furfural |
| 7 lb/hr | Furfural |
| 12.0 lb/hr | Other (Mixed sugars and decomposition products) |
| 290 lb/hr | Water |
| 3.9 lb/hr | Sulfuric Acid |

| THERMAL CONFIGURATION: | |
| --- | --- |
| Zone 1 | 150° F. |
| Zone 2 | 250° F. |
| Zone 3 | 450° F. |
| Zone 4 | 450° F. |

In accordance with the present invention, the process parameters of the invention can vary within a wide degree as set forth hereinafter.

The feed material for wet feeds, can have a consistency of 5% to 50% slurry with a limited viscosity and any cellulose containing material such as paper pulp, wood pulp, waste pulp, etc. can be used.

The feed rate can vary from 100 pounds per hour to 900 pounds per hour depending upon the consistency of the feed material and the RPM of the screw elements.

The reaction temperature can vary from 350° F. to 545° F. at 1000 psi, and may also be higher depending upon the available steam pressure and the ability to discharge quickly. Alternate energy transfer modes are possible such as superheated steam or water or direct heat.

The reaction pressure can vary from 135 to 1000 psi or higher depending upon the available steam pressure and the ability to discharge quickly.

The acid concentration for the process can be from 0 to 10% acid injection at rates of from 0 to 300 pounds per hour. Alternative acids for producing derivatives of fibrous materials such as cellulose can be HCL, HNO3, organic acids, SO₂ gas, etc.

The screw machine RPM can vary from 40 RPM to 300 RPM. The torque varies from 20% to 100% resulting from the screw RPM, the feed rate, the consistency of feed, the screw configuration, the temperature profile, acid rate of injection, conversion rate and discharge rate.

The glucose conversion depends on all of the parameters noted above such as residence time, acid concentration, temperature, mixing which all depend on the machine parameters and can vary from 5% to 90% of the theoretical conversion maximum.

The composition in the reaction zone will vary with the feed and the product composition also varies with the feed and the reaction conditions.

With respect to the screw configuration, the forward conveying preheating zone 22a can be any combination of right handed elements up to 2000 mm in length with 30, 45, 60 or 90 mm pitch elements. Also included therein can be mixing, pulverizing, kneading, etc. elements to provide a homogeneous material to the dynamic seal zone 25. The dynamic seal zone which forms the dynamic plug can be from 15 to 360 mm can comprise 30, 45, 60 or 90 mm lefthanded pitch elements with the unthreaded element constituting a portion of or the entire plug zone and thus can be from 15 to 360 mm in length. The unthreaded cylindrical spacer elements are radially recessed to the extent that they have no screw flights.

The screw configuration in the reaction zone comprises the righthanded forward conveying elements which is up to 2000 mm in length and includes 30, 45, 60 or 90 mm pitch right handed elements.

The thermal configuration is such that all of the zones 2-4 is interchangable and can vary in length from 1 to 3 barrel sections. The preheat zone temperature can vary from 32° to 212° F. and the reaction zone temperatures can vary from 350° to 545° F.

The apparatus and process of the present invention is capable of handling variations in the feed rate to handle both wet and dry feed, from 5 to 100% solids. The feed rate range is from 20 pounds per hour to 150 pounds per hour of sawdust, corn-stover wheat straw, wood chips, MSW, etc.

Depending upon the feed type, that is especially for dry feeds such as saw dust, injection of water before the plug zone at a rate of from 0 to 300 pounds per hour aids in plug formation. Other additives may be used to aid in plug formations such as polypropylene, oils, dewatering from previous batches so as to control torque and reduce wear. When water is injected, it may be injected in the zone 22a forward of the plug zone wherein preheating takes place and equivalent amount of water is added with the acid injection in the reaction zone to maintain equivalent acid concentrations in the reaction zone.

Moreover, several pretreatments for the waste feed stock, in particular for newspaper, can be used to improve the cellulose to glucose conversion yield. The most effective pretreatment found was hydropulping and/or irradiation. The irradiations are carried out at ambient temperatures and in the presence of air with an electron beam accelerator. Irradiation dosages ranging from 5 to 50 megarads can be used and the 10 megarad dosage has been found to be the most commercially effective.

It will be clear to those skilled in the art that the process and apparatus of the present invention can be adapted for use in obtaining other derivatives of cellulose as well as derivatives of other fibrous materials. For example, lignins can be extracted from cellulose by contacting a lignocellulosic slurry or pulp with calcium bisulfite liquor (1% CaO, 4% SO₂) @ a pH of 9.8 injected into the reaction zone and at a temperature of 180°-200° C. by way of the injection of steam into the reaction zone. A highly sulfonated lignosulfonic acid is formed rapidly which is water soluble and can be extracted from the cellulose. Lignosulfonates can be used as binders, etc. for various applications.

It will be appreciated that the instant specification and claims are set forth by way of illustration and not limitation, and that various modifications and changes may be made without departing from the spirit and scope of the present invention.

What is claimed is:

1. In an apparatus for the acid hydrolysis of waste cellulose to glucose of the type having extruding means comprising a housing having means defining a cellulose inlet port receptive of waste cellulose, means defining a steam inlet port and means associated therewith for introducing steam into the cellulose, means defining an outlet port, and a reaction zone between the cellulose inlet port and the outlet port, and twin screws for continuously conveying the waste cellulose through the reaction zone towards the outlet port, means for continuously feeding the waste cellulose to the cellulose inlet port and means for maintaining an elevated temperature and pressure within the reaction zone during discharge, the improvement wherein the maintaining means maintains an elevated pressure of 135 psi to 1000 psi and solely comprises means forming a dynamic seal in the twin screws at the upstream end of the reaction zone and a continuously open discharge orifice pipe downstream of the outlet port configured to permit a predetermined volume of flow necessary to maintain the elevated pressure.

2. The apparatus according to claim 1, wherein the orifice pipe is configured according to $$Q = \frac{\pi(P_O - P_L)R^4}{8\mu L}$$

where Q is the volume rate of flow, $P_O-P_L$ is the pressure differential across the orifice pipe, R is the radius of the pipe, L is the length of the pipe and $\mu$ is the viscosity of the reacted cellulose and wherein the radius of the pipe is smaller than that of the outlet port.

3. The apparatus according to claim 2, further comprising means disposed upstream of the orifice pipe for screening the discharge fed thereto to remove particles and prevent clogging.

4. The apparatus according to claim 3, further comprising means for continuously injecting sulfuric acid into the reaction zone.

5. The apparatus according to claim 4, further comprising means for continuously injecting steam into the reaction zone.

6. The apparatus according to claim 5, further comprising means for pretreating the cellulose material before being received by the feeding means including means for irradiating the cellulose material.

7. The apparatus according to claim 6, wherein the means for continuously feeding the cellulose waste material comprises means for continuously feeding dry cellulose material into the inlet port.

8. The apparatus according to claim 7, wherein the means for continuously feeding water comprises at least one of means for continuously feeding water with the acid catalyst and means for continuously feeding water just upstream of the dynamic seal.

9. In an apparatus for the chemical conversion of solid materials in a multiphase reaction mixture, the apparatus being of the type having extruding means comprising a housing having means defining a solids inlet port receptive of the material to be converted, means defining a gas inlet port and means associated therewith to supply a gas phase reactant to the solid materials, means defining an outlet port and a reaction zone between the solids inlet port and the outlet port and twin screws for continuously conveying the material through the reaction zone and to the outlet port, means for continuously feeding the material to the inlet port; means for maintaining an elevated pressure within the reaction zone during discharge, the improvement wherein the maintaining means solely comprises means forming a dynamic seal at the upstream end of the reaction zone and a continuously open discharge orifice pipe downstream of the outlet port configured to permit a predetermined volume of flow necessary to maintain the elevated pressure.

10. The apparatus according to claim 9, wherein the orifice pipe is configured according to $$Q = \frac{\pi(P_O - P_L)R^4}{8\mu L}$$

where Q is the volume rate of flow, $P_O-P_2$ is the pressure differential across the orifice pipe and R is the radius of the pipe, L is the length of the pipe and $\mu$ is the viscosity of the reacted cellulose and wherein the radius of the pipe is smaller than that of the outlet port.

11. The apparatus according to claim 10, further comprising means disposed upstream of the orifice pipe for screening the discharge fed thereto to remove particles and prevent clogging.

* * * * *